United States Patent
Morgan, III

(10) Patent No.: US 7,440,995 B2
(45) Date of Patent: Oct. 21, 2008

(54) STORAGE MEDIUM ENCODED WITH A SERVER PROGRAM AND METHOD USING SAME

(75) Inventor: George J. Morgan, III, Wooster, OH (US)

(73) Assignee: EvREsearch Ltd., Columbus, OH (US)

( * ) Notice: Subject to any disclaimer, the term of this patent is extended or adjusted under 35 U.S.C. 154(b) by 477 days.

(21) Appl. No.: 10/201,596

(22) Filed: Jul. 23, 2002

(65) Prior Publication Data

US 2003/0033316 A1    Feb. 13, 2003

Related U.S. Application Data

(60) Provisional application No. 60/307,283, filed on Jul. 23, 2001.

(51) Int. Cl.
  *G06F 15/16* (2006.01)
(52) U.S. Cl. .................. 709/203; 709/217; 709/218; 709/227; 709/229; 707/6; 707/7
(58) Field of Classification Search .......... 709/203, 709/217, 218, 229, 227; 707/5, 6, 7; 713/1
See application file for complete search history.

(56) References Cited

U.S. PATENT DOCUMENTS

| | | | |
|---|---|---|---|
| 5,835,759 A * | 11/1998 | Moore et al. ............. | 713/1 |
| 5,991,798 A * | 11/1999 | Ozaki et al. ............. | 709/217 |
| 6,175,830 B1 * | 1/2001 | Maynard ................. | 707/5 |
| 6,466,983 B1 * | 10/2002 | Strazza ................... | 709/227 |
| 6,502,137 B1 * | 12/2002 | Peterson et al. ......... | 709/229 |
| 6,606,654 B1 * | 8/2003 | Borman et al. .......... | 709/219 |
| 6,609,159 B1 * | 8/2003 | Dukach et al. .......... | 719/331 |
| 6,651,059 B1 * | 11/2003 | Sundaresan et al. ..... | 707/6 |
| 2002/0129016 A1 * | 9/2002 | Christfort et al. ....... | 707/6 |

FOREIGN PATENT DOCUMENTS

FR    2800182    4/2001

OTHER PUBLICATIONS

Mascha, M. et al., "Interactive education: Transitioning CD-ROMs to the Web", Computer Networks and ISDN Systems, vol. 27, pp. 267-272 (1994).

* cited by examiner

*Primary Examiner*—Yves Dalencourt
(74) *Attorney, Agent, or Firm*—Taft Stettinius & Hollister LLP

(57) ABSTRACT

A storage medium is encoded with a server program readable by a computer or computational user interface and launchable by the computer or computational user interface from the storage medium or from another storage medium to which it has been copied or from both. The server program does not require any manipulation of any storage medium from which it is launched. A method for accessing an information resource includes obtaining a static storage medium encoded with a stand-alone server program. The server program is linkable to an information resource residing at least in part on the Internet. The server program is launched from the static storage medium. The web browser is launched. A request for data to be obtained from the information resource residing on the Internet is sent using the web browser. A response to the request is constructed using the server program.

20 Claims, 2 Drawing Sheets

STORAGE MEDIUM ENCODED WITH A SERVER PROGRAM AND METHOD USING SAME

The present application claims priority of U.S. Provisional Application Ser. No. 60/307,283 filed Jul. 23, 2001, the entire disclosure of which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the PTO patent files or records, but otherwise reserves all copyright rights whatsoever.

TECHNICAL FIELD

The present invention relates generally to computers or computational user interfaces, and more particularly to a storage medium encoded with a server program which is readable by the computer or computational user interface and to a method using a storage medium.

BACKGROUND OF THE INVENTION

This invention provides in one example for the creation of world-wide-web servers that can be run from a static CD-ROM, a static DVD or other static storage device without requiring installation to dynamic storage devices such as computer hard-drives. The invention also provides in another example for storage devices such as CDROMS (R and RW CDROMS) and EPROMS having a server program resident on the storage device.

Currently, auto-running websites and mark-up language solutions on static storage devices are limited in their functionality because they:

a) require installation of code or software onto dynamic storage devices for the fully functional operation of the resident software, website or other information manipulation solutions; and/or b) provide incomplete operational solutions (such as searching, graphing, creation of cookie files, file transfer, creation of directories or assembly of finite elements) as compared to the same software which is available from servers over the internet; and/or c) require browsers (such as Netscape or Microsoft Internet Explorer) that were already installed on the dynamics storage devices to communicate with the server.

The assumed limitation to developing fully-functional, auto-running, stand-alone servers on static storage devices has been that existing web-server source codes require that the servers write to dynamic storage devices.

It has been known to build hybrids of CDROM titles and online service. These hybrid technologies have appeared from both directions, with online services developing mechanisms to work with supplementary multimedia content on CDROM, and CDROM titles providing online access support for downloading update information. In the online oriented model, supplemental CDs can be sent monthly to subscribers for use in conjunction with their online sessions. A limiting factor has been a reliance on the remote web server to provide functionality and content. Even though it was originally envisioned that CD's would compliment the online services the consumer demands functionality that makes content useful and interactive. The web server provides this functionality and must be accessed online. Our new technology solves this problem.

In an online oriented hybrid, the supplementary information distributed on CD can be artfully integrated during an online session to enhance the online experience. Unfortunately, this approach does little to open access to network neophytes. The hybrid from a CDROM-based orientation may stand a better chance of solving the access problem, through embedded communications modules that allow a user to retrieve updated information from a remote service, going online only when needed.

Such a facility is easy to use—transparent even—because its function is preset to work with that specific CDROM product, where the communications task is simply to call a designated number to obtain an information update and place it on the hard disk, making it available for use in conjunction with the existing information on the CDROM.

The two most effective and popular technologies in electronic publishing and the much heralded information highway are CD-ROM and the Internet. They have complementary advantages and disadvantages. Ease of use for CD-ROM is unparalleled and has evolved into a cheap, easy to use and powerful repository for all kinds of multimedia information. But because the discs are inherently static and unchanging, their content rapidly becomes outdated. Online services, on the other hand, have gained popularity by offering up-to-the-minute access to massive libraries and news feeds. However, online services can be expensive and difficult to use, while finding relevant information online is often frustrating and time-consuming.

Unfortunately, these services are still rather hard to use. First, just getting a modem to dial and connect successfully to a remote service presents a significant hurdle to most novices. Communications software ranges from arcane and complex to just moderately easy to use at best. Finally, the task of finding a desired information item may be a nuisance on the better-designed services, and a labyrinthine quest through obscure terrain in the farther reaches of the Internet.

Compounding the Internets' degree of difficulty is the fact that these services work on a subscription basis, rather than a discrete purchase, product basis. You can buy a CDROM as easily as a magazine or book, but to get information online you must subscribe to a service in advance. Consumer and Internet online services generally run about $20 per month, while others also bill to an open credit card for additional charges based on time used. They typically average about $20 per month. Business online services can run at $1 to $10 per minute, a rate that generally leads to very rationed use.

Because online services are operated as broad utility services, their user interfaces tend toward rigidity and are by and large less enticing than those provided with the better CDROM products. Current developments are gradually permitting more attractive and tailored interfaces, but the complexity of online communications and navigation will limit this for some time yet.

As the Web tidal wave rushes on, the once-bright future of CD-ROM looks tarnished. Distribution is a killer, publishers have been shaken out, and the category seems to be limping along in a narrow niche. But digging deeper reveals some very powerful currents in the world of CD/online hybrids. Currents which players like Intel, Microsoft, and Netscape have not missed, and which many smaller but significant players are tooling up for.

Hybrids are simple and compelling in concept: online Web technology and offline CD-ROM technology each have major, but complementary weaknesses. The Web is dynamic and limitless—until you try to suck multimedia down your slow telephone line—a problem that will not disappear as quickly as the enthusiasts would like to think. CD-ROMs are static and limited without inherent functionality, but supply 650 MB of quality multimedia at high speed and can be mailed for $1. (DVD-ROM does even better). Combine them and you get the best of both—and that will not change any time soon.

First generation CD/online hybrids gained attention in early 1994. It first gained a degree of industry attention at the Intermedia Conference in March 1994, when Microsoft Corporation announced its consumer CD-ROM title Complete Baseball, which incorporated a modem-supported daily baseball statistics update feature. Wider recognition of its potential is still slowly growing.

With the appearance of Microsoft Complete Baseball and CompuServeCD. Complete Baseball augmented a CD-based encyclopedia with daily online updates covering game scores and news, so it remained current. CompuServeCD augmented the online service with topical multimedia content and the ability to search offline through a massive list of online files. Hundreds of similar titles have appeared, aimed at both consumer and business-to-business markets, including Microsoft Encarta, Blockbuster Video Guide to Movies & Videos, which get current updates online, and catalog CD's such as 2Market, which allow online ordering and product updates.

Complete Baseball relies on a web server for dynamic information. Content that is subject to frequent changes is not suitable for the static nature of CD's. CompuServeCD relies on a web server for functionality to search offline through a massive list of online files. Catalog CD's such as 2Market, which allow online ordering and product updates rely on a web server to provide functionality for order selection and order creation and to process the order and credit card transactions. Activities not suited for the static nature of CD's.

The growth of hybrids has been slow, partly due to distraction, and partly due to consumer revenue models, which are inconsistent with the availability of "free" services on the Web. But there are new currents in Web software, which bring renewed promise for hybrids to serve as powerful vehicles for information distribution and marketing.

Simple CD/Web hybrids appeared in early 1995, offering the most basic level of integration, namely the inclusion of HTML (Web format) content on CDs, and the embedding of one-way links to the Web from the CD. These exploit the ability to give or mail CD-ROMs to users. That not only pre-positions bulky content, but solves another key problem with the Web—how to get users to find you.

Much more powerful forms of integration are now possible with our technology. A key barrier to the growth of CD/online hybrids of all varieties is the need for custom software. The removal of this barrier by our powerful technology promises great success hybrids.

Three major tools have existed that have not been well integrated:
  Caching of Web content. A standard facility in mainstream Web browsers.
    This allows pre-positioning of content on the CD, which can be accessed at high speed (either online or offline) in conjunction with timelier, dynamic content from a Web Server.
  Parallel searching of local CD, web server and remote Web content.
    This provides a seamlessly consolidated result to a single search request. Personal Library Software has led in this area, with many others in the game as well.
  Offline access facilities that download designated Web content to the local hard disk quickly and automatically (on-demand or at scheduled times) can now be managed with our technology.
    This enables subsequent browsing at high speed with access to the full functionality of a web server (without need for further connection). No other packages do this, and our technology does not require the installation of any software on the users computer.

The first two of these enable smooth integration of the Web and CD. Whether the user starts from the Web and slips in the CD to provide web server functionality and as a pre-loaded cache, or starts with a CD and links out to the Web for fresh content, the experience becomes seamless. Smart browsers decide whether to get content from the CD or the Web by checking which is newer. Our patented technology applied as a search engine gives consolidated results lists with links to either Web or CD content.

One of the greatest opportunities is for richly illustrated, searchable catalogs, with current specials and online ordering with the web server functionality resident on the users computer. This greatly reduces the online web server's need to process the programmatic functionality and increases the ability of the online web server to service, by many orders of magnitude, the delivery of content. The ability to cheaply put them directly into the hands of qualified prospects is a big plus. Product documentation is another: Cisco Systems now ships theirs on a hybrid using Verity's search engine and Spyglass' cache at the rate of 80,000 per month. U.S. Pat. No. 6,175,830B1 applied as a search engine along with a server in accordance with this invention be a tremendous enhancement to Cisco's offering.

Adding offline access facilities and web server functionality offers even more flexibility and convenience, particularly where the Web is not always accessible or responsive. Sales force automation is a prime application. An outside salesman carries a CD catalog, and connects to the Web (or intranet) periodically to get new product and pricing information downloaded to his hard disk (perhaps overnight). It is then on his hard disk, available at customer sites, with no more need for a phone line (or cellular expense). The functionality of our new technology means that the sales force does not need to connect to the corporate web server to process orders, quotations or other services. Only the resulting order needs to be transmitted greatly reducing connect time charges and corporate web server loading and brings the full benefit of the corporate server environment to the offline computer, without the need to install any software. Only new data or updated content needs to be stored on the off line system.

Reflecting the wide variety of such opportunities, InfoTech (Woodstock, Vt.) had forecast CD/online hybrid titles increasing from 311 in 1995 to 720 in 1966, going to 3,500 in 1997 and over 25,000 in 2000. In 1966 Intel made a major commitment to promoting hybrids as a way to circumvent the bandwidth problem that threatened to limit Web growth. The expected success of hybrids was never realized largely due to the lack of our solution. Figuring out exactly how you might apply this technology to serve information distribution needs is well worth a little thought. For a wide spectrum of applications this approach brings to CD-ROM products the immediacy of online access while retaining none of its disadvantages. And it does this with plain old telephone service.

SUMMARY OF THE INVENTION

A first expression of an embodiment of the invention is for a storage apparatus including a storage medium. The storage medium is encoded with a server program which is readable by a computer or a computational user interface. The server program is launchable by the computer or the computational user interface from the storage medium or from another storage medium to which it has been copied or from both. The server program does not require any manipulation of any storage medium from which it is launched.

A method of the invention is for accessing an information resource from a computer or computational user interface. A static storage medium is obtained encoded with a stand-alone server program which is readable by the computer or computational user interface and which is launchable by the computer or computational user interface from the static storage medium. The server program does not require any manipulation of the static storage medium. The server program is linkable to an information resource residing at least in part on the Internet. The server program provides a back end server resource for a web browser. The server program is launched from the static storage medium. The web browser is launched. A request for data to be obtained from the information resource residing on the Internet is sent using the web browser. A response to the request is constructed using the server program.

Several benefits and advantages are derived from one or more of the first expression of an embodiment and a method of the invention. By having the server program in one enablement be launchable from a static storage medium (such as a static CD-ROM which is readable by a CD-ROM drive of a computer or computational user interface), the prior art problems of installing the server program on a dynamic storage medium (such as a hard drive platter of a hard drive of a computer or computational user interface) are avoided. In one example, the invention provides for the creation of world-wide-web servers that can be run from a static CD-ROM, a static DVD or other static storage devices without requiring installation to dynamic storage devices such as computer hard-drives. In another example, the invention provides for storage devices such as CDROMS (R and RW CDROMS) and EPROMS having a server program resident on the storage device. Because the server program in another example lacks any write-to-storage-medium requirements, the server program is protected against hackers when launched from a static storage medium and/or when launched from a dynamic storage medium accessible by the computer or computational user interface only with read-only hardware.

DESCRIPTION OF THE PREFERRED EMBODIMENTS

Figure 1:
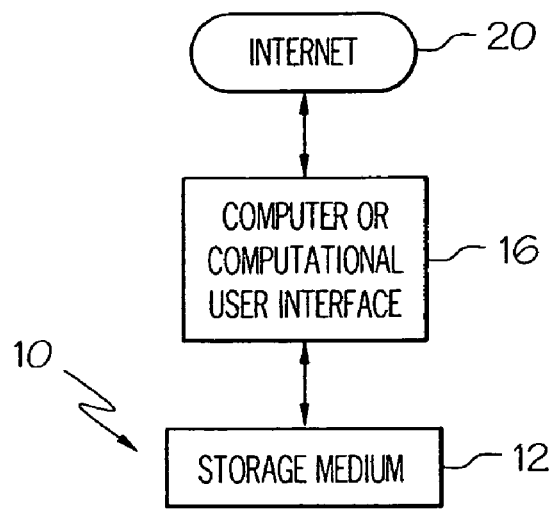
FIG. 1 is a block diagram of an embodiment of a system which uses the storage apparatus of the invention.
Figure 2:
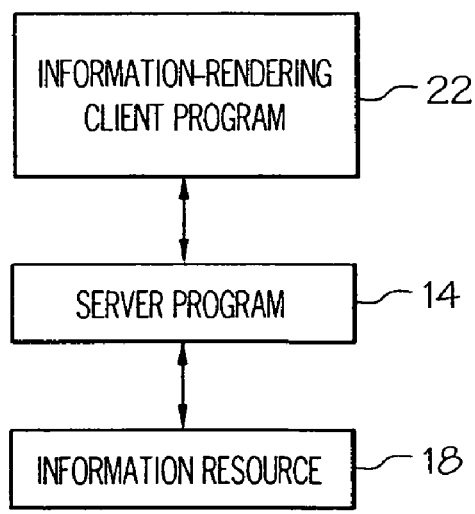
FIG. 2 is a block diagram showing an embodiment of a program linkage for the server program which is encoded on the storage medium of FIG. 1.

Referring to FIGS. 1-2, a first expression of an embodiment of the invention is for a storage apparatus 10 including a storage medium 12. The storage medium 12 is encoded with a server program 14. The server program 14 is readable by a computer or computational user interface 16 and is launchable by the computer or computational user interface 16 from the storage medium 12 or from another storage medium to which it has been copied or from both. The server program 14 does not require any manipulation of any storage medium from which it is launched. For purposes of describing the invention, RAM (random access memory) is not considered to be a storage apparatus. For purposes of describing the invention, manipulation of a storage medium does not include mere encoding and/or mere copying of the server program on and/or to a storage medium, does not include reading from a storage medium, but does include modification of (e.g., writing to) a storage medium beyond mere encoding and/or mere copying of the server program on and/or to a storage medium.

A broad method of the invention is for running a server program and includes steps a) and b). Step a) includes obtaining a server program 14 which is readable by a computer or computational user interface 16 and which does not require any manipulation of any storage medium from which it is launched. Step b) includes launching the server program 14 from the storage medium using the computer or computational user interface 16.

A dynamic storage medium is a storage medium which can be read, which can be written to, and whose previously-written space can be re-written to. A static storage medium is a storage medium which can be read, which can be written to, but whose previously-written space cannot be re-written to. In one design, the server program is a stand-alone server program. The server program of the storage medium of the first expression of an embodiment of the invention is protected from hackers when the storage medium is a static storage medium. The server program of the storage medium of the first expression of an embodiment of the invention is protected from hackers when the storage medium is a dynamic storage medium accessible by the computer or computational user interface only with read-only hardware.

An example, without limitation, of a static storage medium is a read-only CD-ROM which is readable by a read-only CD-ROM drive and/or a read-write CD-ROM drive of a computer. An example, without limitation, of a dynamic storage medium is a hard drive platter of a hard drive of a computer. An example, without limitation, of a computational user interface is a dumb terminal. Other examples of static and dynamic storage media and computational user interfaces are left to the artisan and to the inventor if not later discussed herein. The terminology "server program" includes any computer program including, without limitation, a web-server program and a word-processing program. In one choice of a server program, the server program includes a web-server program having no requirement to write to any dynamic storage medium. In one variation, the server program 14 is launched by the computer or computational user interface 16 from a static storage medium wherein (at least part of) the server program 14 is copied into RAM of the computer or computational user interface 14 and execution of the program begun. In another variation, the server program 14 is copied to a dynamic storage medium and launched by the computer or computational user interface 16 from the dynamic storage medium wherein copying of the server program to the dynamic storage medium makes the server program launchable from the dynamic storage medium without installing the server program on the dynamic storage medium by otherwise having to write to the dynamic storage medium, and wherein (at least a part of) such copy in the dynamic storage medium is copied into RAM of the computer or computational user interface 14 and execution of the program begun.

In one example, the server program 14 is linkable to an information resource 18 (such as one residing on the Internet 20), and the server program 14 provides a back end server resource for an information-rendering client program 22. Examples, without limitation, of an information resource 18 include Web pages, documents, and databases. In one variation, the information-rendering client program 22 resides in another computer or computational user interface (not shown). In another variation, the information-rendering client program 22 is encoded on the storage medium 12. In the same or a different example, the server program 14 does not require the manipulation of any storage medium.

In one arrangement, the information-rendering client program 22 includes a search engine or an integration engine for searching the information resource. In one variation, the search engine or integration engine includes a web browser. An integration engine is a search engine that provides the search results in a user-controllable hierarchy.

In one implementation, the information resource 18 resides at least in part on the storage medium 12. In one variation, the information resource 18 resides in part other than on the static storage medium 12. In one modification, the information resource resides in part on a network. In the same or a different modification, the information resource resides in part on a separate storage medium of the computer or computational user interface 16.

In one enablement, the server program 14 is linkable to a system chosen from the group consisting of a network, the Internet 20, an extranet, or another computer or computational user interface. In the same or a different enablement, the information-rendering client program 22 is chosen from the group consisting of a computer operating system, a web browser, and a database engine.

In one illustration, the static storage medium 12 is a static storage medium. One example of this, without limitation, is a static CD-ROM. In one use, the static CD-ROM is placed in a read-only or read-write CD-ROM drive of a computer or computational user interface. In another illustration, the storage medium 12 is a dynamic storage medium. One example of this, without limitation, is a hard-drive platter of a hard drive of a computer or computational user interface.

Appendix A is an example, without limitation, of an ANSI C source code for a server program. It is noted that writing a server program, which is launchable by a computer or computational user interface from a storage medium or from another storage medium to which it has been copied or from both and which does not require any manipulation of any storage medium from which it is launched, is within the level of skill of the artisan.

In one extension, the storage medium 12 is also encoded with a controller. Appendix B is an example, without limitation, of an ANSI C source code for a controller. The controller is readable by the computer or computational user interface 16 and is launchable by the computer or computational user interface 16 from the storage medium 12. The controller provides front end management for the information-rendering client program 22. In one example, the controller is a scripting engine.

Figure 3:
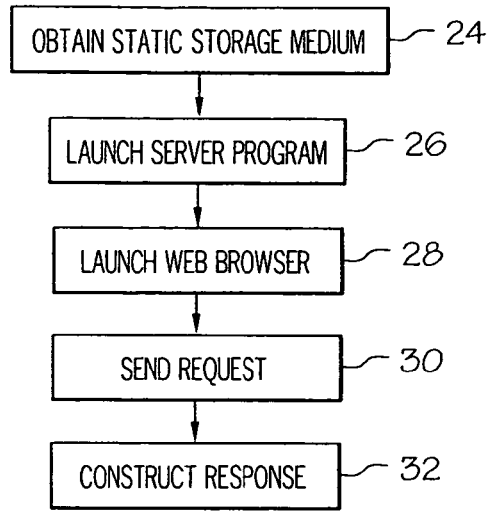
FIG. 3 is a flow chart of a method for accessing an information resource from a computer or computational user interface using the server program of FIG. 2.
Figure 4:
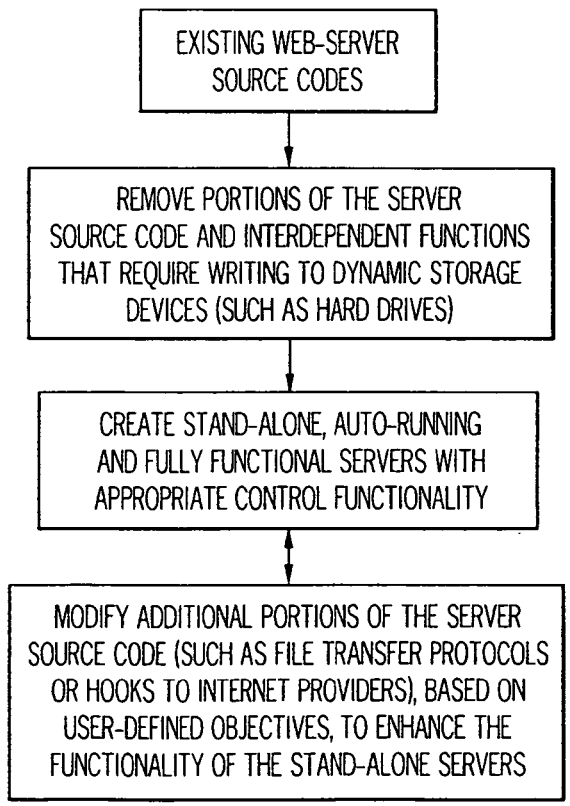
FIG. 4 is a flow chart of a method for creating an example of the server program of FIG. 2 for enabling the implementation of servers that are fully-functional, stand-alone and auto-running on static non-modifiable media such as cd-rom, prom computer chips, or dynamic read-write media such as computer hard drives and other similar devices.

Another method of the invention is for accessing an information resource 18 from a computer or computational user interface 16 and is shown in flow-chart form in FIG. 3. The first method includes steps a) through e). Step a) is labeled as "Obtain Static Storage Medium" in block 24 of FIG. 3. Step a) includes obtaining a static storage medium encoded with a stand-alone server program 14 which is readable by the computer or computational user interface 16 and which is launchable by the computer or computational user interface 16 from the static storage medium, wherein the server program 14 does not require any manipulation of the static storage medium, wherein the server program 14 is linkable to an information resource residing at least in part on the Internet, and wherein the server program 14 provides a back end server resource for a web browser. Step b) is labeled as "Launch Server Program" in block 26 of FIG. 3. Step b) includes launching the server program 14 from the static storage medium. Step c) is labeled as "Launch Web Browser" in block 28 of FIG. 3. Step c) includes launching the web browser. Step d) is labeled as "Send Request" in block 30 of FIG. 3. Step d) includes sending a request for data to be obtained from the information resource residing on the Internet using the web browser. Step e) is labeled as "Construct Response" in block 32 of FIG. 3. Step e) includes constructing a response to the request using the server program.

In one implementation of the first method, the information resource includes at least a portion encoded on the static storage medium. In one variation, the information resource includes a portion residing on a dynamic storage medium of the computer or computational user interface 16. In the same or a different implementation, the response includes an HTML web page. In the same or a different implementation, the web browser is encoded on the static storage medium.

The following is a further discussion of examples of embodiments and a further discussion of examples of methods of the invention.

In one example, the invention equips static modifiable and non-modifiable storage devices (such as a CD-ROM or Programmable Read Only Memory (PROM) computer chip, Erasable Programmable Read Only Memory (EPROM) computer chip or other write once read many device) with two primary software components: (1) a server component and (2) a control component. When coupled with a data base that may be resident on the same or a different storage device, the invention provides a dynamic retrieval functionality that can be executed by a client such as a web browser or other rendering software or device. Static storage media are normally limited to the storage and retrieval of static information. In accordance with one embodiment the invention, the server resident on the static storage media imparts dynamic functionality to the storage device that allows the user to access the storage device via a web browser with requests for information. The server dynamically constructs a response, typically (but not necessarily) in the form of an HTML page. In one embodiment, the invention is a CDROM product catalogue. Whereas it would require excessive amounts of storage space to store all the pages that might be of interest to a particular customer, with the resident server, pages tailored to the customer can be constructed on the fly based on user defined objectives.

The control component (e.g., a Windows scripting engine) may be embedded into or contained on the static medium or device and act as a front end management or container for an electronic file or other electronic information rendering system or program such as but not limited to, computer operating systems, web browsers, database engines, and other systems or programs that require, use or manipulate and/or control associated hardware and software or other primary, subsidiary or tertiary computer resources to provide local functionality; or the software may be embedded into or wrapped around software and or files or other electronic representations of data residing on a computer. In one embodiment, the control component provides an auto-run functionality in which resource access and operation sequence is controlled from the storage medium. The control component may be utilized any time a client computer, server or system component or resource would require determination or differentiations and direction or decision making processes when determining when or how a local or remote resource should access available resources thus providing an auto-run function.

The server component may be embedded into or contained on a static medium and act as a back end server or container for an electronic file or other electronic information rendering system or program such as but not limited to, web browsers, database engines, and other systems or programs that require or use other primary, subsidiary or tertiary computer resources to provide enhanced functionality; or the software may be embedded into or wrapped around software and or files or other electronic representations of data residing on a computer. The server component may be utilized any time a computer operating system(s), web browser(s), database engine(s), and other system(s) or program(s) would otherwise require a connection to a network, Internet, extranet or other server resource not inherently resident on a client computer or system to provide additional functionality.

In one embodiment of the invention, the stand-alone server is coded by removing the requirements, references or dependent functions for writing to dynamic storage devices from web-server source codes such as Microsoft Internet Information Server, Netscape or Apache, as illustrated by the flowchart in FIG. 3. In other words, the write references and interdependent functions in existing web-server source codes are vestigial for the purposes of creating fully-functional, auto-running, stand-alone web servers. Additional modifications to existing web-server source codes (such as removing file transfer protocols or re-directing hooks to Internet Provider addresses) can be manipulated to accomplish user-defined operational objectives on the stand-alone server technologies (FIG. 3).

An example reduction to practice of the stand-alone server technologies is provided by the:

attached stand-alone server technology source code; and attached script source code.

Summary of Features of One Embodiment

It can run on all UNIX platforms, OS/2, OpenVMS, Windows 3.x, Windows 95, and Windows NT.

Ease of use. The software comes fully configured. It is not necessary to change a single option to run it.

Small, fast, and robust: it's preferably based on a solid software engineering tools developed for multithreaded TCP/IP servers.

Unlike any other web server, the server is preferably designed as a set of portable reusable components. It's easy to extend and reincorporate.

Runs from CD. No need to install any software on the host computer.

Complete solution delivered as an archive file ready for inclusion on the CD.

Server can be designed to support HTTP/1.0, FTP, CGI/1.1, SSI protocols, server-side image maps, user-defined MIME types, multiple document roots, persistent connections, on-the-fly server reconfiguration, customizable error messages, multilingual HTML documents and multilingual CGI scripts, HTTP GET, HEAD, PUT, DELETE, MOVE, and COPY methods, customizable HTTP headers;

Security: basic authentication per directory, FTP access rights per user and per directory, on-the-fly user and password management, Unix setuid, restrict access by IP address, safe CGIs, SSL option;

Logging: CLF, IIS, XML, and custom log file formats, programmed log file cycling, asynchronous reverse DNS lookups;

Virtual hosts: multihoming HTTP and FTP hosts, HTTP/1.1 virtual hosts, full independent configuration (log files, web spaces, access rights,) per virtual host;

Configuration: editable config files, or through a web-based administration interface (WBA) that includes virtual host wizard, server control (restart, terminate), active connection monitor, and full configuration of server options, security, users, etc.;

Applications: direct support for CGI scripts in Perl, Awk, Rexx, Python, WSX protocol for plug-in extensions, SSI protocol for dynamic web pages, ISAPI under Windows, filter protocol for arbitrary web page filters, LRWP protocol for persistent (fast CGI) applications in Perl, C, Python, Java, Java Servlets;

Deployment: installs ready-to-run, portable to Windows, OS/2, Unix, OpenVMS, fully portable web sites and web applications;

Performance: internal multithreading engine, fast even on slower systems, small footprint, option to restrict HTTP and FTP connections, FTP quota manager.

In accordance with an example of the invention the power and feature rich delivery of a complete Internet Web Server is available with the ease of use and instant delivery of a CD into a single offline solution without losing the ability to interact with traditional online servers and resources at the same time. This combination of technologies provides a solution to high volume high bandwidth interactive and functional content delivery in an offline solution that provides for interaction with online services.

Applications of the stand-alone server technologies that are believed to have immediate commercial value for numerous activities, such as:

running secure websites;

playing interactive web-based electronic games that could be operated from hand-held computers with mini-CD drives;

operating searchable databases, as with the patented technology on the Information Management, Display and Retrieval System and Method (U.S. Pat. No. 6,175,830);

publishing interactive books and other materials;

creating novel solutions for interactive business cards;

providing novel educational course delivery, instruction and grading solutions; or providing promotional and advertising materials without installation requirements; or providing fully searchable, interactive user manuals for manufacturing, repair and other companies.

Overall, the stand-alone server technologies will provide value added to consumers as well as producers through enhanced information security, storage and manipulation based on user-defined objectives in relation to available internet access and computer systems.

In summary, one manifestation of the invention is a computer readable static storage medium having recorded thereon a server program and a control program.

Another manifestation of the invention is a computer readable static storage medium having recorded thereon a server program, a control program, and a database.

In more specific manifestations of the invention, the storage medium is a CDROM, a PROM, an EPROM or another "write once read many" storage device.

In another more specific manifestation of the invention, the storage medium additionally includes a search engine for searching the database.

In another manifestation of the invention, the storage medium additionally includes thereon a web browser.

In a more particular manifestation of the invention, the control program is a scripting engine.

Another manifestation of the invention is a computer readable static storage medium having recorded thereon a server program and a control program and that is designed to be recorded with a directory containing data.

Another manifestation of the invention is a method for accessing data on a computer readable storage medium which comprises:
 providing a computer readable static storage medium having recorded thereon a server program, and a control program;
 launching the server program from the storage medium;
 launching a web browser;
 formulating a request using the web browser, and
 constructing a response to the request using the server wherein the data base may be available on the same or a different storage medium.

In a more particular manifestation of the invention, the data is product data such as a product catalogue and it is provided on the same storage medium, e.g., as a CDROM.

In another manifestation of the invention the storage medium additionally includes a web browser.

In a more particular manifestation of the aforesaid method, the response is an HTML web page.

In a more particular manifestation of the invention the server is a web server.

In a still more particular manifestation of the invention, the server is a conventional web server such as Netscape or Microsoft Internet Information Service from which commands to write to dynamic storage devices have been removed.

Several benefits and advantages are derived from one or more of the first expression of an embodiment and a method of the invention. By having the server program in one anablement be launchable from a static storage medium (such as a static CD-ROM which is readable by a CD-ROM drive of a computer or computational user interface), the prior art problems of installing the server program on a dynamic storage medium (such as a hard drive platter of a hard drive of a computer or computational user interface) are avoided. In one example, the invention provides for the creation of world-wide-web servers that can be run from a static CD-ROM, a static DVD or other static storage devices without requiring installation to dynamic storage devices such as computer hard-drives. In another example, the invention provides for storage devices such as CDROMS (R and RW CDROMS) and EPROMS having a server program resident on the storage device. Because the server program in another example lacks any write-to-storage-medium requirements, the server program is protected against hackers when launched from a static storage medium and/or when launched from a dynamic storage medium accessible by the computer or computational user interface only with read-only hardware.

The foregoing description of embodiments, methods, examples, etc. of the invention has been presented for purposes of illustration. It is not intended to be exhaustive or to limit the invention to the precise procedures or precise forms disclosed, and obviously many modifications and variations are possible in light of the above teaching. It is intended that the scope of the invention be defined by the claims appended hereto.

The invention claimed is:

1. A storage apparatus comprising a storage medium encoded with a server program which is readable by a computer or computational user interface, which is launchable by the computer or computational user interface from the storage medium or from another storage medium to which the server program has been copied or from both, and which inhibits writing to the storage medium from which the server program is launched, wherein the server program includes a web-server program having no requirement to write to a dynamic storage medium, wherein the server program is linkable to an information resource, and wherein the server program provides a back end server resource for an information-rendering client program by dynamically constructing a data file in response to a request from the information-rendering client program wherein the information-rendering client program is encoded on the storage medium; and wherein the storage medium is also encoded with a controller which is readable by the computer or computational user interface and which is launchable by the computer or computational user interface from the storage medium, and wherein the controller provides front end management for the information-rendering client program.

2. The storage apparatus of claim 1, wherein the information-rendering client program resides in another computer or computational user interface.

3. The storage apparatus of claim 1, wherein the information-rendering client program includes a search engine or an integration engine for searching the information resource.

4. The storage apparatus of claim 3, wherein the search engine or integration engine includes a web browser.

5. The storage apparatus of claim 1, wherein the information resource resides at least in part on the storage medium.

6. The storage apparatus of claim 1, wherein the information resource resides in part other than on the storage medium.

7. The storage apparatus of claim 6, wherein the information resource resides in part on a network.

8. The storage apparatus of claim 7, wherein the information resource resides in part on a separate storage medium of the computer or computational user interface.

9. The storage apparatus of claim 1, wherein the server program is linkable to a system chosen from the group consisting of a network, the Internet, an extranet, or another computer or computational user interface.

10. The storage apparatus of claim 1, wherein the information-rendering client program is chosen from the group consisting of a computer operating system, a web browser, and a database engine.

11. The storage apparatus of claim 1, wherein the storage medium is a static storage medium.

12. The storage apparatus of claim 1, wherein the storage medium is a dynamic storage medium.

13. The storage apparatus of claim 1, wherein the controller is a scripting engine.

14. A storage apparatus comprising a static storage medium encoded with a stand-alone server program and a controller which are both readable by a computer or computational user interface and which are both launchable by the computer or computational user interface from the static storage medium, wherein the server program inhibits writing to the static storage medium, wherein the server program includes at least one of a word-processing software application and a web-server program having no requirement to write to a dynamic storage medium, wherein the server program is linkable to an information resource, wherein the controller provides front end management for an information-rendering client program, wherein the server program provides a back end server resource for the information-rendering client program by dynamically constructing a data file in response to a request from the information-rendering client program, wherein the information-rendering client program is encoded on the static storage medium, and wherein the information resource resides in part on the static storage medium and in part on a network.

15. A method for accessing an information resource from a computer or computational user interface comprising the steps of:
   a) obtaining a static storage medium encoded with a stand-alone server program which is readable by the computer or computational user interface and which is launchable by the computer or computational user interface from the static storage medium, wherein the server program inhibits writing to the static storage medium, wherein the server program includes at least one of a word-processing software application and a web-server program having no requirement to write to a dynamic storage medium, wherein the server program is linkable to an information resource, and wherein the server program provides a back end server resource for a web browser;
   b) launching the server program from the static storage medium;
   c) launching the web browser;
   d) sending a request for data to be obtained from the information resource using the web browser; and
   e) dynamically constructing a response to the request using the server program.

16. The method of claim 15, wherein the information resource includes at least a portion encoded on the static storage medium.

17. The method of claim 16, wherein the information resource includes a portion residing on a dynamic storage medium of the computer or computational user interface.

18. The method of claim 15, wherein the response includes an HTML web page.

19. The method of claim 15, wherein the web browser is encoded on the static storage medium.

20. A storage apparatus comprising a storage medium encoded with a server program which is readable by a computer or computational user interface, which is launchable by the computer or computational user interface from the storage medium or from another storage medium to which the server program has been copied or from both, and which inhibits writing to the storage medium from which the server program is launched, wherein the server program includes a word-processing software application having no requirement to write to a dynamic storage medium, wherein the server program is linkable to an information resource, and wherein the server program provides a back end server resource for an information-rendering client program by dynamically constructing a data file in response to a request from the information-rendering client program wherein the information-rendering client program is encoded on the storage medium; and wherein the storage medium is also encoded with a controller which is readable by the computer or computational user interface and which is launchable by the computer or computational user interface from the storage medium, and wherein the controller provides front end management for the information-rendering client program.

* * * * *